(12) United States Patent
Yang

(10) Patent No.: US 11,784,479 B1
(45) Date of Patent: Oct. 10, 2023

(54) RAPID WIRING DEVICE

(71) Applicant: SMART ELECTRIC WORKS CO., LTD., Chang Hua Hsien (TW)

(72) Inventor: Jerry Yang, Taichung (TW)

(73) Assignee: SMART ELECTRIC WORKS CO., LTD., Chang Hua Hsien (TW)

( * ) Notice: Subject to any disclaimer, the term of this patent is extended or adjusted under 35 U.S.C. 154(b) by 0 days.

(21) Appl. No.: 18/116,228

(22) Filed: Mar. 1, 2023

(51) Int. Cl.
*H02G 3/18* (2006.01)
*H02G 3/08* (2006.01)

(52) U.S. Cl.
CPC ............... *H02G 3/18* (2013.01); *H02G 3/088* (2013.01)

(58) Field of Classification Search
CPC .................................... H01G 3/18; H01R 4/26
See application file for complete search history.

(56) References Cited

U.S. PATENT DOCUMENTS

| | | | | |
|---|---|---|---|---|
| 9,583,843 B2* | 2/2017 | McGregor | ......... | H01R 13/6271 |
| 10,756,484 B1* | 8/2020 | Schmidt | ............... | H01R 13/424 |
| 11,677,181 B2* | 6/2023 | Chen | ................... | H01R 13/5812 |
| | | | | 439/460 |
| 2007/0007038 A1* | 1/2007 | Cox | ...................... | H02G 15/013 |
| | | | | 174/650 |
| 2011/0095020 A1* | 4/2011 | Yang | ...................... | H02G 3/088 |
| | | | | 220/3.2 |

* cited by examiner

*Primary Examiner* — Hung V Ngo

(74) *Attorney, Agent, or Firm* — Che-Yang Chen; Law Office of Michael Chen

(57) ABSTRACT

A rapid wiring device includes a junction box provided with a limiting groove of which the bottom surface is provided with the tip portions of two conductors. A wire box fixing a second electric wire is set in the limiting groove, then it is combined on the junction box through a tightening cover, which is used to push the wire box to move towards the bottom of the limiting groove, so that the tip portions of the two conductors pass through the wire box and penetrate the insulating layer of the second electric wire to touch the core wire of the second electric wire, so that the first electric wire and the second electric wire are quickly connected.

18 Claims, 17 Drawing Sheets

US 11,784,479 B1

RAPID WIRING DEVICE

BACKGROUND OF THE INVENTION (a) Field of the Invention

The present invention relates to the technical field of rapid wiring devices, more particularly to a rapid wiring device capable of wiring at multiple arbitrary positions on a power supply line, which is suitable for parallel installation of many garden lights, track lights or other electrical appliances.

(b) Description of the Prior Art

Regarding the combined connection of two wires, the conventional common way is to peel off the insulating adhesive layer at the joint ends of the two wires, and then entangle the exposed metal wires to form a connection, and then use insulating tape to wrap the connection to complete the combined connection of the two wires. For this reason, the inventor once proposed a technology of a watertight junction box, U.S. Ser. No. 08/101,874B2, which overcomes the shortcomings of the prior art. However, the previous U.S. Ser. No. 08/101,874B2 watertight junction box has the following problems:
  (1) When the wires are put into the junction box, there is no more precise and stable fixing technology for the wires, so when the locking action of the lock cover is used to push the wires to be pierced by the copper thorns, it is prone to problems such as left and right flipping and offset of the wire, resulting in the inability of the copper thorn to penetrate correctly. Moreover, after the wire is turned left and right, if the lock cover is forcibly locked, the copper thorn may be skewed and deformed.
  (2) The waterproof structure adopts jelly glue to be pre-buried under the upper floating plate. The lock cover must be completely locked to make the jelly glue overflow to produce a sealing effect.
  If the locking stroke is insufficient, the jelly glue may not produce the expected effect.
  (3) The threaded part 11 of the above-mentioned patent is divided into two pieces, and its thread does not completely surround the threaded part 11, causing the thread of the lock cover to misalign with the threaded part 11 during the locking process, and the lock cover is easily crooked, causing inconvenience in use.

SUMMARY OF THE INVENTION

The present invention has been accomplished under the circumstances in view. It is therefore the main object of the present invention to provide a rapid wiring device, which includes a limiting groove on the upper part of the box body of a junction box, two position-limiting portions located on both sides of the limiting groove, and two conductors connected with a first electric wire. The tip portions of the two conductors protrude from the bottom of the limiting groove. The first electric wire is used to connect to track lights, garden lights or other electrical appliances. In addition, implement a wire box consisting of a lower wire box part and an upper wire box part. There is a wire groove recessed on the lower wire box part, which is used to make a second electric wire (such as the main power supply line) be placed in the wire groove. The upper wire box part covers the lower wire box part, and covers the wire groove and second electric wire, so that the wire box can sandwich the second electric wire and put them together in the limiting groove of the junction box. Through the positioning function of the wire box, the second electric wire is accurately aligned with the tip portions of the two conductors. The wire box is set in the limiting groove of the junction box, and then combined with a tightening cover on the upper part of the junction box. The tightening cover has a push portion that can exert force on the wire box. Through the design of tightening cover screw locking or fastening on the upper part of the junction box, the push portion pushes the wire box to move towards the bottom of the limiting groove, so that the tip portions of the two conductors pass through the wire box and penetrate into the insulating layer of the second electric wire precisely until the tip portions of the two conductors touch the core wire of the second electric wire to complete the quick wiring.

It is another object of the present invention to provide a rapid wiring device, which is provided with a waterproof film inside or below the wire box, used to make the tip portions of the two conductors pass through the waterproof film, and then make the waterproof film close to the tip portions and the outer surface of the second electric wire to achieve fast wiring and also have the function of preventing water from penetrating into the second electric wire.

It is still another object of the present invention to provide a rapid wiring device, which can accurately locate the wire box and second electric wire through other structural designs of the wire box, junction box and tightening cover, and the wiring operation mode is fast and convenient, and the tightening cover can be precisely locked with the junction box.

DETAILED DESCRIPTION OF THE PREFERRED EMBODIMENTS

Figure 1:
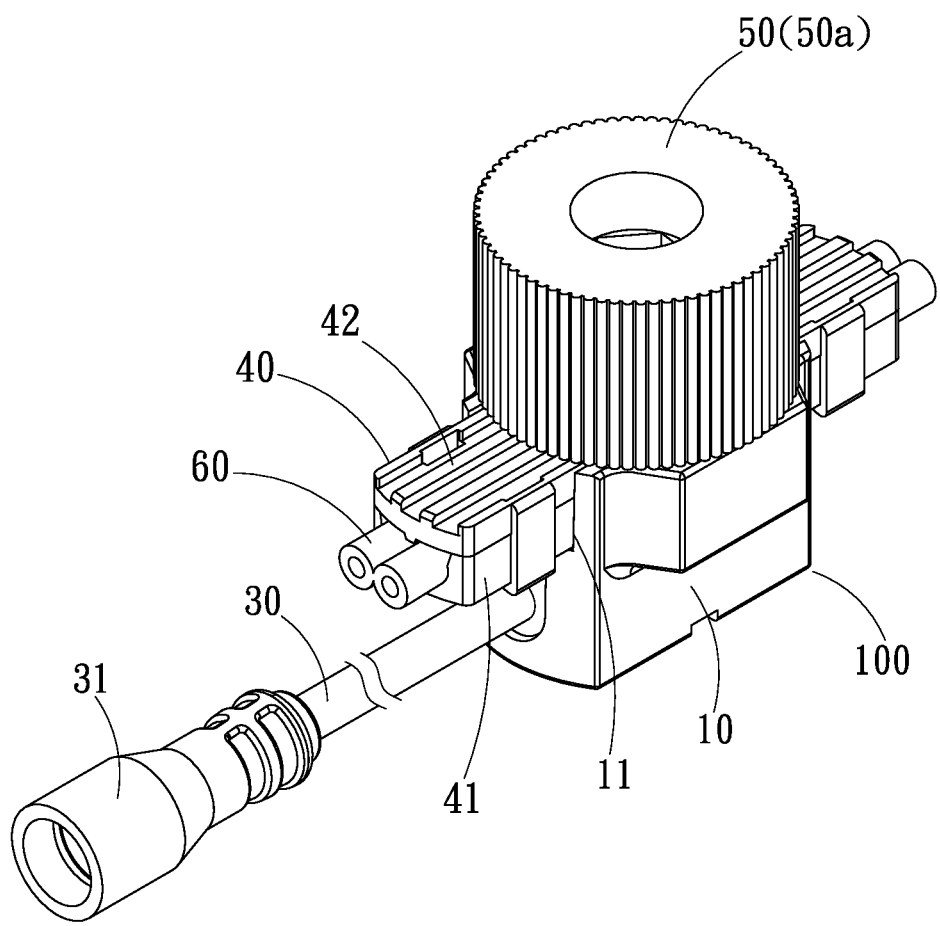
FIG. 1 is a combined schematic diagram of an embodiment of the screw-locking rapid wiring device of the present invention.

A rapid wiring device of the present invention is a rapid wiring device used for wiring at multiple arbitrary positions on a power supply line, so as to connect multiple garden lights, track lights or other electrical appliances in parallel on the power supply line. As shown in FIGS. 1 to 5, the rapid wiring device comprises a junction box 100, a wire box 40 and a tightening cover 50.

The junction box 100 comprises a box body 10, two conductors 20 and a first electric wire 30. The box body 10 is a box body or other structure made of insulating material, its appearance and shape are not limited, mainly a limiting groove 11 is implemented on its upper part, and two position-limiting portion 12 are located on both sides of the limiting groove 11. The limiting groove 11 is recessed from the upper end of the box body 10 to the lower end, and communicates with both sides or both ends of the box body 10, so a position-limiting portion 12 is formed on each of both sides of the limiting groove 11. The two conductors 20 are copper sheets or other metal sheets, which are respectively arranged in the box body 10. Each conductor 20 has a tip portion 21 protruding from the bottom surface of the limiting groove 11, and the tip portion 21 extends into the limiting groove 11 for piercing into a second electric wire 60 to form a conductive connection. One end of the first electric wire 30 is respectively connected to the two conductors 20, and the other end can be connected to a quick connector 31.

Figure 2:
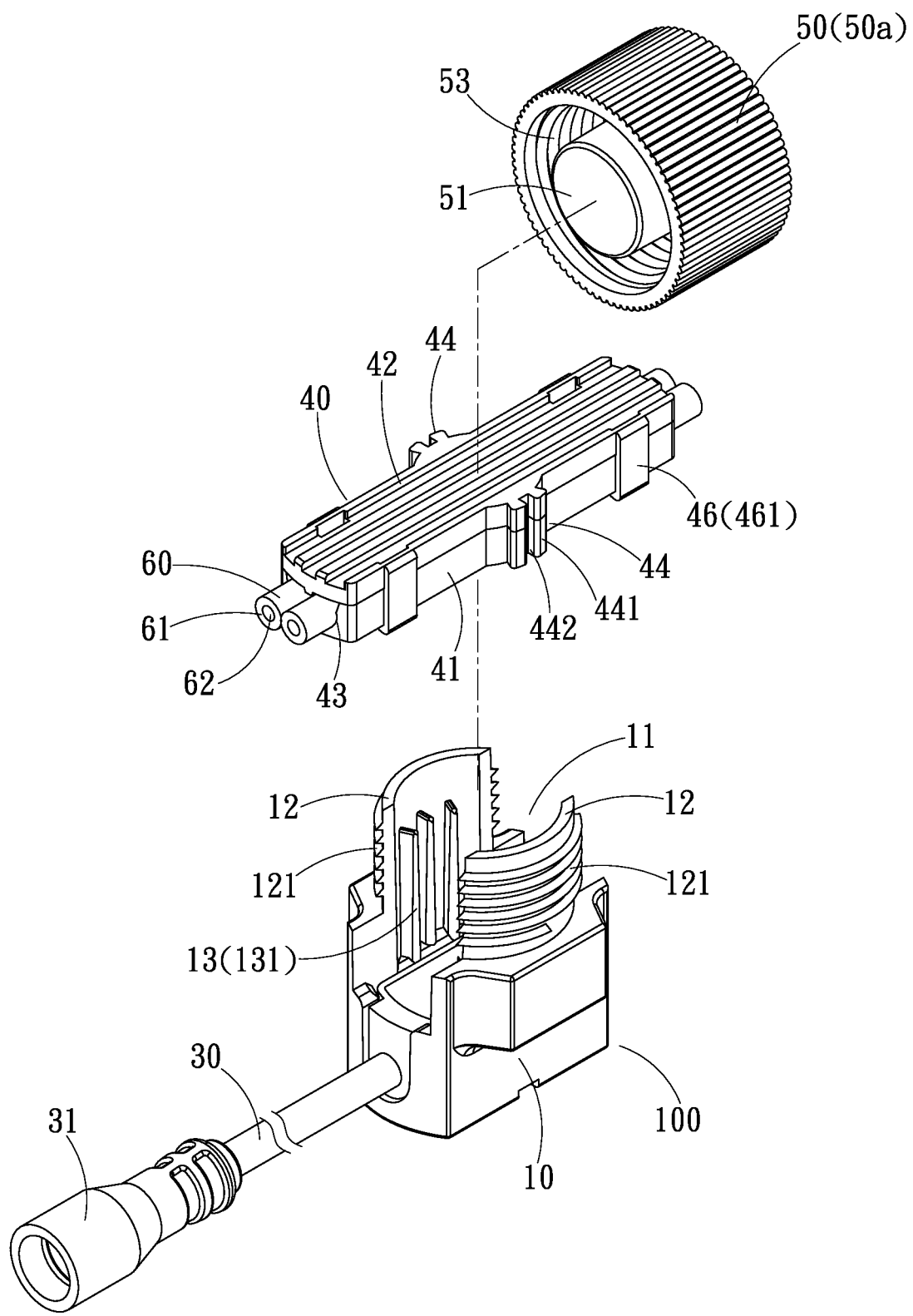
FIG. 2 is an exploded schematic diagram of the embodiment of the screw-locking rapid wiring device of FIG. 1 of the present invention.
Figure 4:
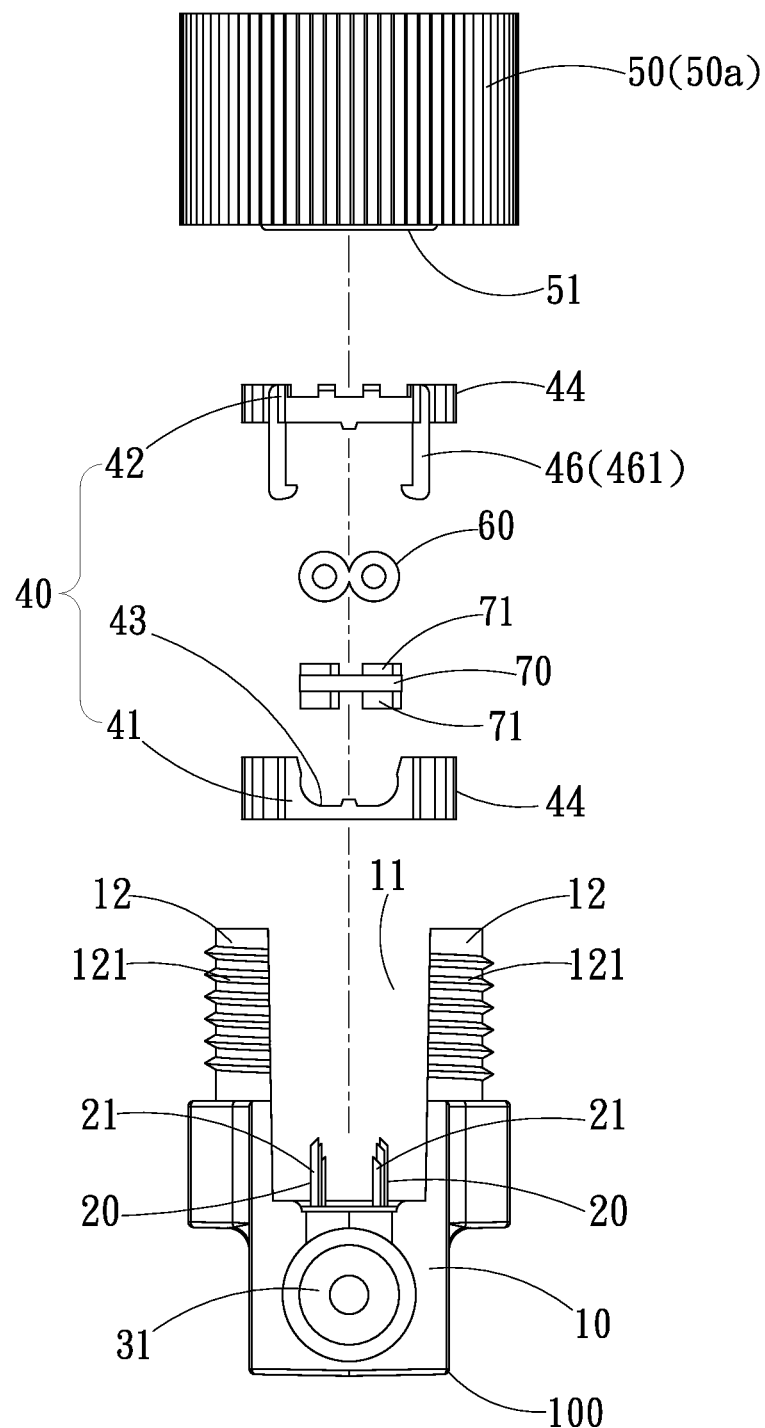
FIG. 4 is an exploded schematic diagram of the first embodiment of the rapid wiring device and wire box of FIG. 2 of the present invention.
Figure 8:
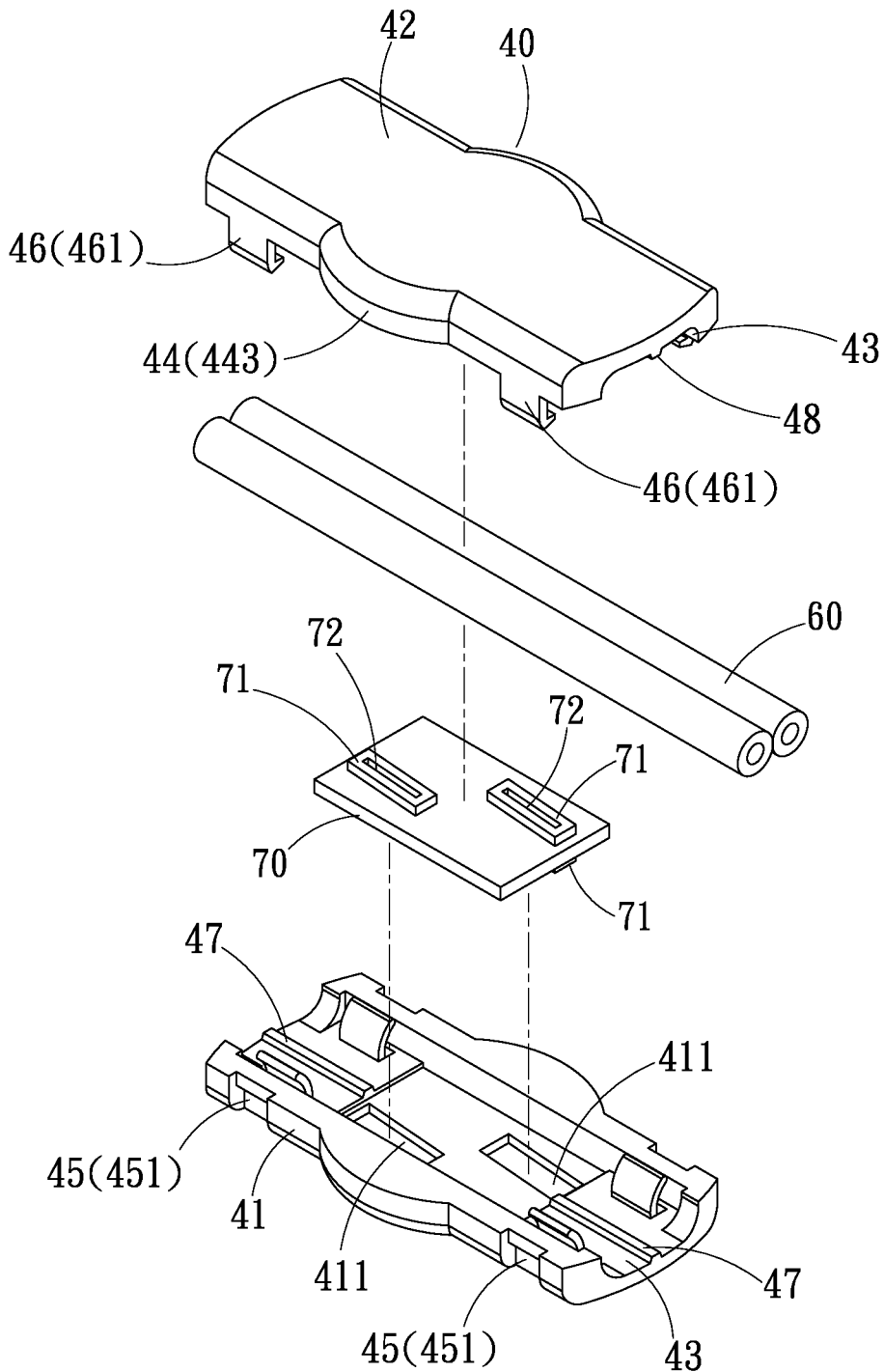
FIG. 8 is an exploded schematic view of the third embodiment of the wire box of the present invention.
Figure 10:
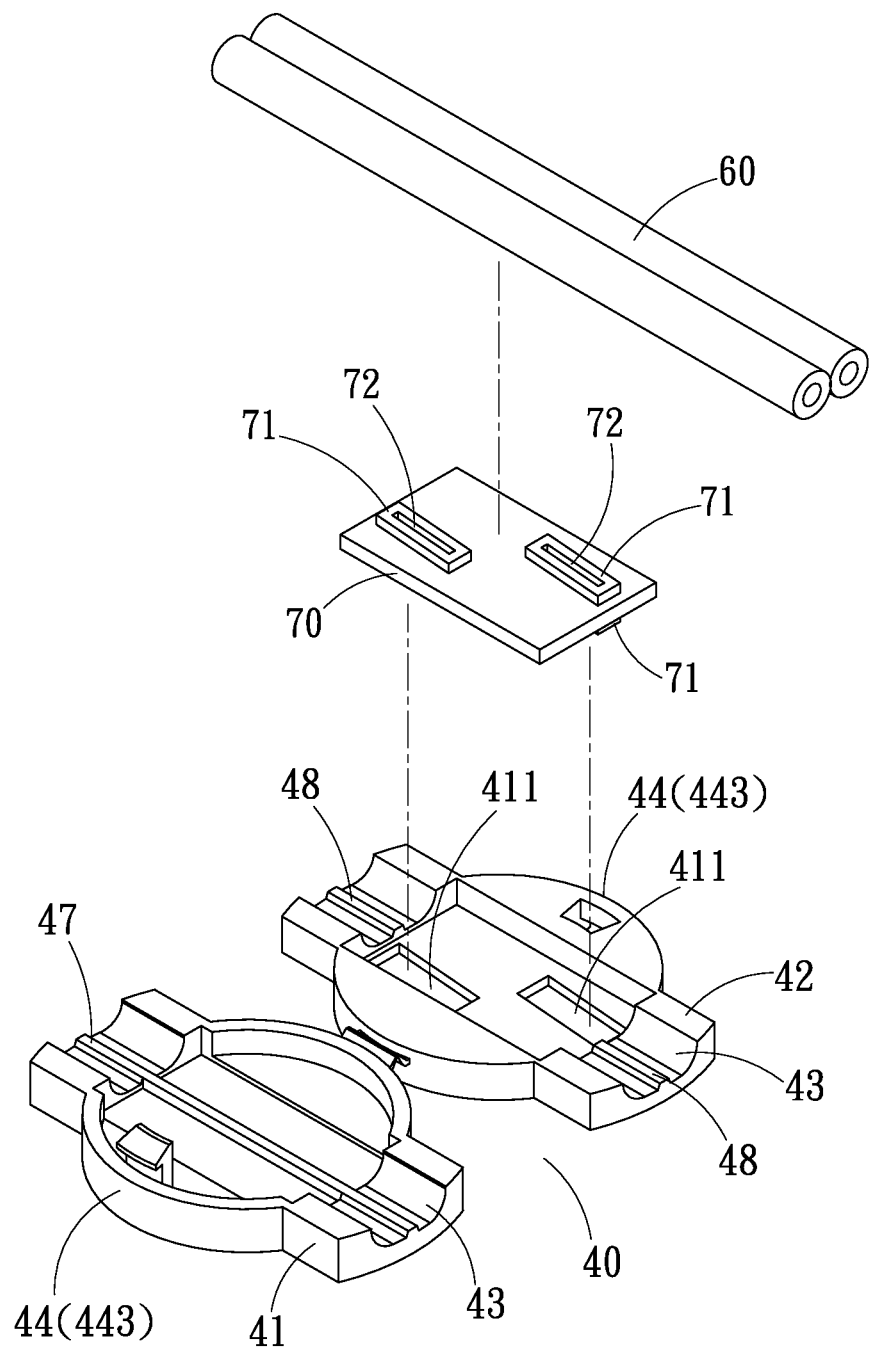
FIG. 10 is an exploded schematic diagram of the open state of the fourth embodiment of the wire box of FIG. 9 of the present invention.

The wire box 40 is a small box made of insulating material, which comprises a lower wire box part 41 and an upper wire box part 42 that can be covered together. The upper part of the lower wire box part 41 is recessed with a wire groove 43, the wire groove 43 extends to both ends of the lower wire box part 41, and its width is the same as or slightly smaller than that of the wire, so that when the user installs the rapid wiring device of the present invention on a second electric wire 60 (such as the main power supply line), first place the selected position of the second electric wire 60 in the wire groove 43 for positioning (as shown in FIG. 4). The upper wire box part 42 is covered on the lower wire box part 41 by snap-fitting and other structures, and is used to cover the wire groove 43 and the second electric wire 60, forming a state where the lower wire box part 41 and the upper wire box part 42 sandwich the second electric wire 60 (as shown in FIG. 2). Then put the wire box 40 sandwiching the second electric wire 60 into the limiting groove 11 of the junction box 100, and then use the tightening cover 50 described below to pressurize. Similarly, the upper wire box part 42 can also be provided with a wire groove 43 (as shown in FIG. 8 and FIG. 10), and the second electric wire 60 can be fixed together by the lower wire box part 41 and the wire groove 43 of the upper wire box part 42.

The tightening cover 50 can be implemented in various forms, and it is mainly used to provide users with DIY operation, which can push the above-mentioned wire box 40 to sink into the bottom surface of the limiting groove 11 of the junction box 100, so that the tip portions 21 of the two conductors 20 can be inserted into the second electric wire 60.

Figure 5:
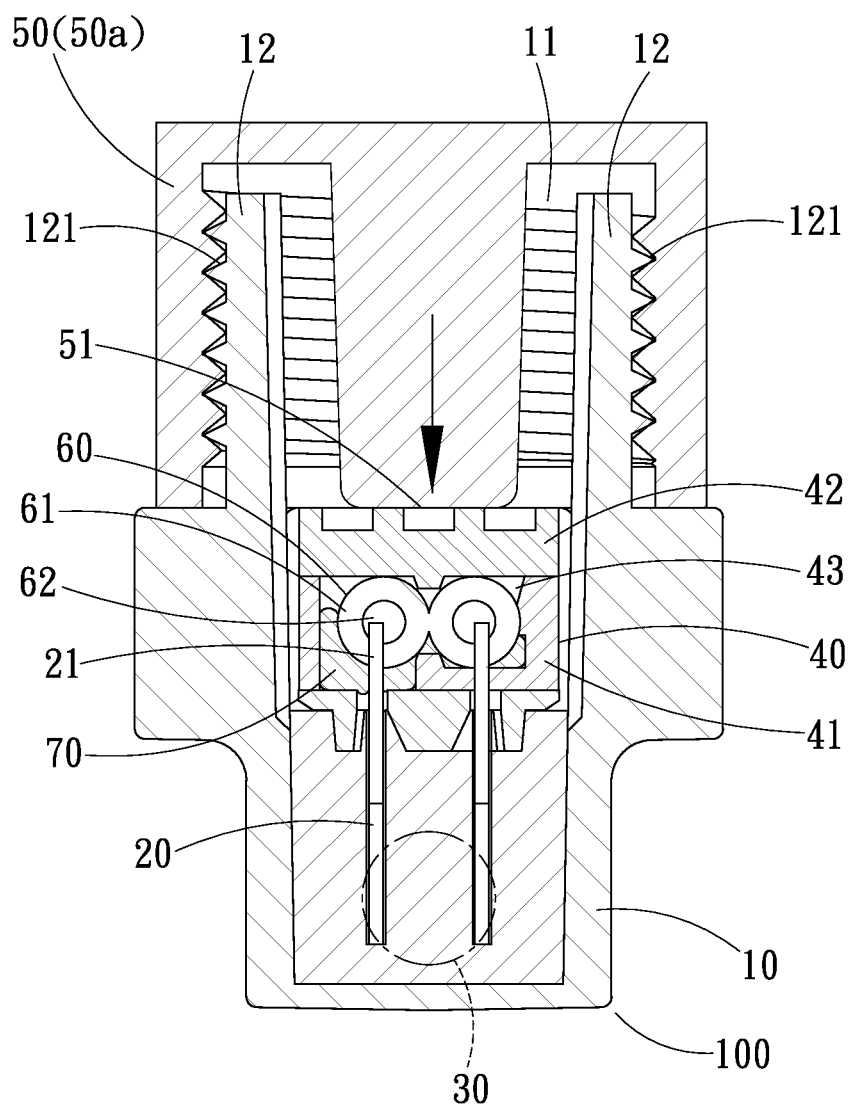
FIG. 5 is a cross-sectional schematic diagram of the tip portions of the two conductors of FIG. 4 of the present invention piercing into the second electric wire.

The tightening cover 50 is detachably combined on the upper part of the junction box 100, and is characterized in that a push portion 51 for applying a thrust to the wire box 40 is implemented. The push portion 51 can push the wire box 40 sandwiching the second electric wire 60 to move towards the bottom surface of the limiting groove 11, and during the movement, the tip portions 21 of the two conductors 20 will pass through the wire box 40, and then penetrate the insulating layer 61 of the second electric wire 60 until they touch the core wire 62 of the second electric wire (as shown in FIG. 5). This provides the user with a quick connection between the first electric wire 30 and the second electric wire 60 through the two conductors 20.

Figure 3:
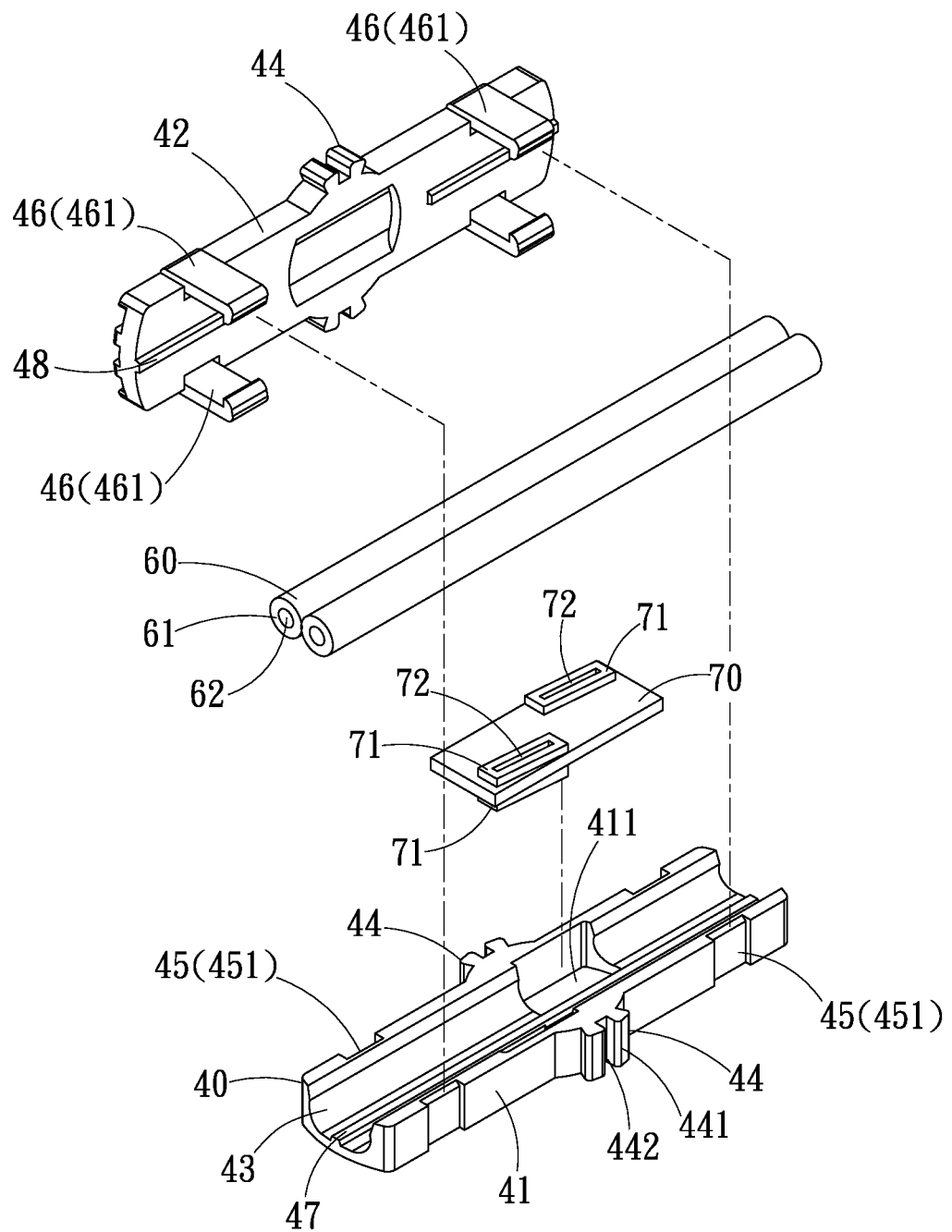
FIG. 3 is an exploded schematic view of the first embodiment of the wire box of FIG. 1 of the present invention.
Figure 7:
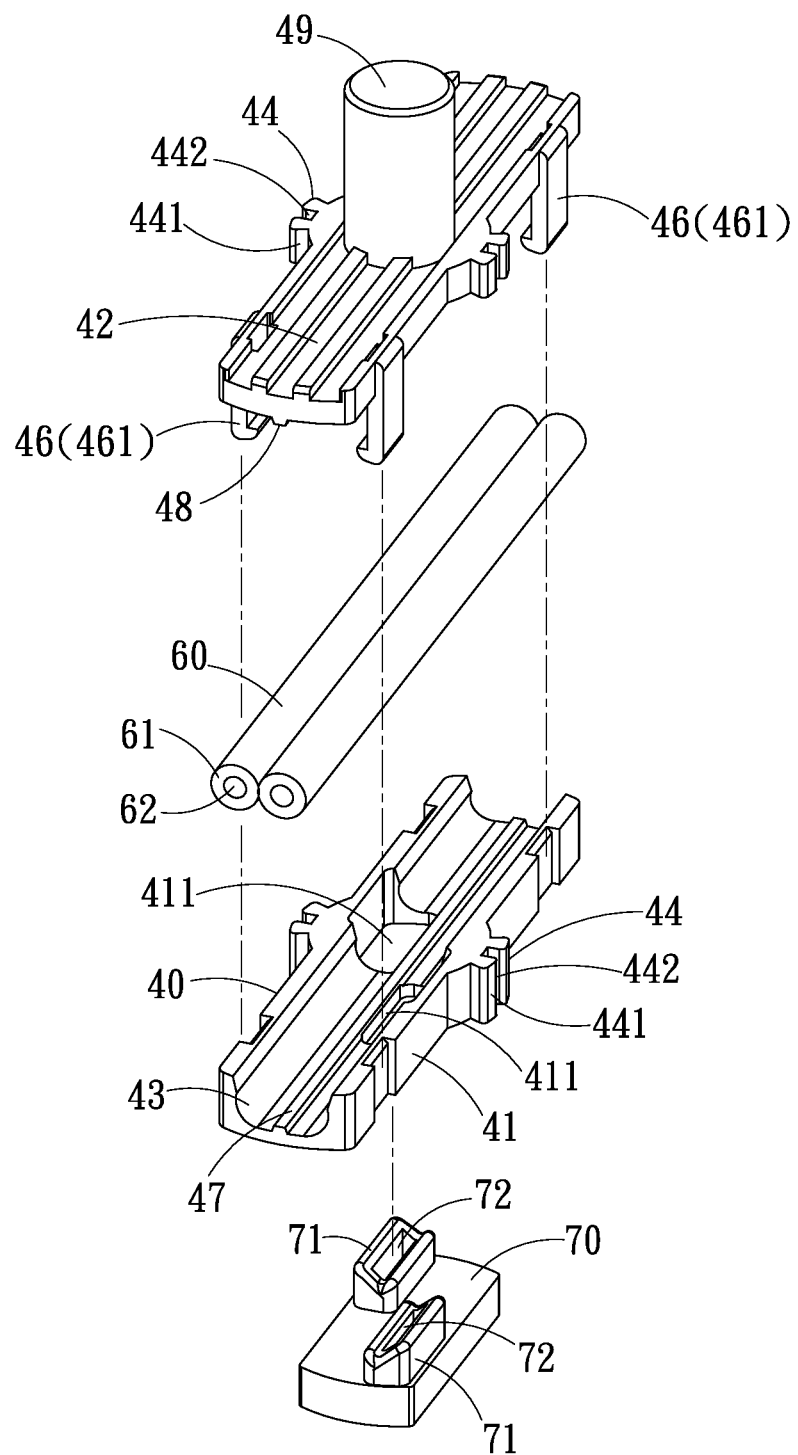
FIG. 7 is an exploded schematic view of the second embodiment of the wire box of FIG. 6 of the present invention.

Referring to FIG. 3, the wire box 40 can implement a waterproof film 70. The waterproof film 70 is arranged on the bottom surface of the wire groove 43 of the lower wire box part 41, or arranged under the lower wire box part 41 (as shown in FIG. 7), for making the tip portions 21 of the two conductors 20 pass through the waterproof film 70, so that the waterproof film 70 is tightly attached to the periphery of the tip portions 21 and the outer surface of the second electric wire 60. More specifically, the lower wire box part 41 is provided with a first perforation 411 connecting the wire groove 43 and the lower wire box part 41. The material of the waterproof film 70 can be silicone, rubber or jelly glue, and one or both sides of the waterproof film 70 have a bump 71 corresponding to the first perforation. The bump 71 is provided with a second perforation 72 connected to the other side of the waterproof film 70. The waterproof film 70 is set in the lower wire box part 41 so that the bump 71 can be embedded in the first perforation 411. Thereby, when the above-mentioned tightening cover 50 pushes the wire box 40 to sink, the tip portions 21 of the above-mentioned two conductors 20 can pass through the second perforation 72 of the waterproof film 70, and then penetrate into the insulating layer 61 of the second electric wire 60, thus achieving the dual functions of quick wiring and waterproofing.

Referring to FIG. 2 and FIG. 3, FIG. 6 and FIG. 7, in order to ensure that the wire box 40 can accurately align the second electric wire 60 with the tip portion 21 of each conductor 20, and prevent the wire box 40 from flipping or shifting its position when the tightening cover 50 pushes the wire box 40, in the present invention, a first guide portion 13 is integrally formed on the inner side walls of the two position-limiting portions 12 of the box body 10, and a second guide portion 44 is implemented on both sides of the lower wire box part 41 and the upper wire box part 42 of the wire box 40. When the wire box 40 is inserted into the limiting groove 11 through the opening, the first guide portion 13 of the box body 10 is positioned on the second guide portion 44 on both sides of the wire box 40.

Figure 9:
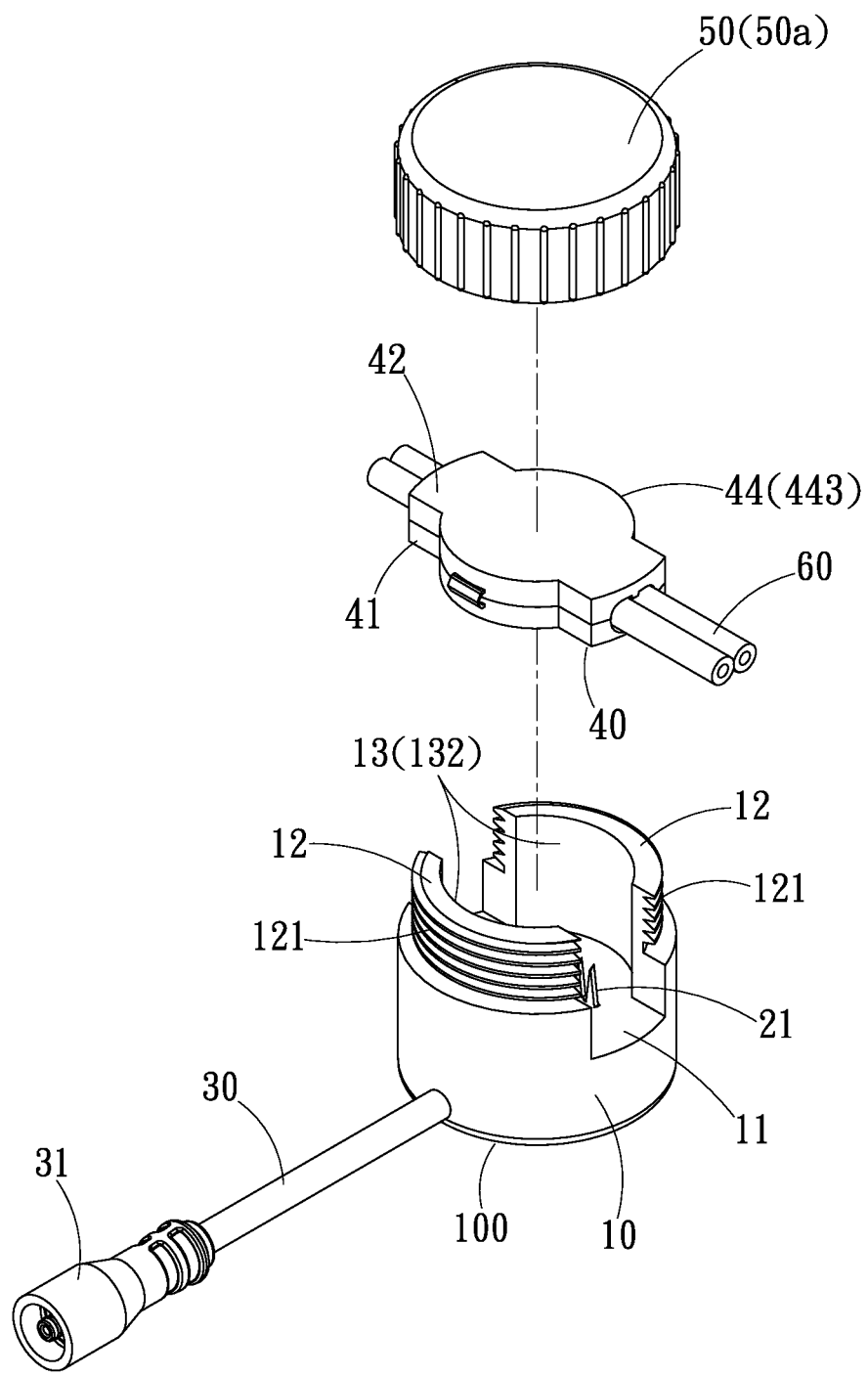
FIG. 9 is an exploded schematic view of the fourth embodiment of the screw locking type rapid wiring device and wire box of the present invention.

Referring again to FIG. 2 and FIG. 3, FIG. 6 and FIG. 7, in one embodiment, the above-mentioned first guide portion 13 comprises a plurality of first guide strips 131 protruding from the inner side walls of the two position-limiting portions 12 into the limiting groove 11, and the second guide portion 44 comprises a plurality of second guide strips 441 and guide grooves 442 protruding from both sides of the lower wire box part 41 and the upper wire box part 42. The first guide strips 131 extend into the guide grooves 442 to guide the movement of the wire box 40, and prevent the wire box 40 from flipping or shifting when moving. Referring to FIG. 8 and FIG. 9, in another embodiment, the above-mentioned first guide portion 13 comprises concave arc surfaces 132 formed on the inner side walls of the two position-limiting portions 12, and the second guide portion 44 of the wire box 40 comprises semicircular bumps 443 protruding from both sides of the lower wire box part 41 and the upper wire box part 42. When the wire box 40 is inserted into the limiting groove 11 through the opening of the limiting groove 11, the semicircular bumps 443 on both sides fit the concave arc surfaces 132, so that the same function and effect can be achieved.

Referring again to FIG. 3, FIG. 7 and FIG. 8, one embodiment of the combination of the lower wire box part 41 and the upper wire box part 42 of the wire box 40 of the present invention comprises that they are fastened together through a buckle structure. The buckle structure comprises at least one first fastening portion 45 on both sides of the lower wire box part 41, and one embodiment of the first fastening portion 45 can be a fastening groove 451; and the both sides of the upper wire box part 42 are respectively provided with at least one second fastening portion 46, and the second fastening portion 46 can be a fastening elastic piece 461. When the user covers the upper wire box part 42 on the lower wire box part 41 to clamp the second electric wire 60, the fastening elastic piece 461 of the second fastening portion 46 is fastened to the fastening groove 451 of the first fastening portion 45 to prevent the lower wire box part 41 from separating from the upper wire box part 42, and maintain the role of firmly clamping the second electric wire 60. In addition, referring to FIG. 10 and FIG. 11, another embodiment of the combination of the lower wire box part 41 and the upper wire box part 42 of the wire box 40 comprises: one side of the lower wire box part 41 and the upper wire box part 42 are connected together through an integral molding structure or a pivot structure, so that the lower wire box part 41 and the upper wire box part 42 can be flipped open and closed. The lower wire box part 41 and the other side of the upper wire box part 42 are fastened together through the above-mentioned buckle structure, that is, only the other side implements the above-mentioned structure of the first fastening portion 45 and the second fastening portion 46.

Referring again to FIG. 3, FIG. 7 and FIG. 8, the bottom surface of the wire groove 43 of the wire box 40 of the present invention can be further implemented with a first convex strip 47, and the lower surface of the upper wire box part 42 has a second convex strip 48. The first convex strip 47 and the second convex strip 48 can be used to clamp the central recesses on the upper and lower sides of the second electric wire 60, so that the second electric wire 60 can be positioned in the wire groove 43 more precisely.

A kind of rapid wiring device of the present invention, according to the different embodiments of the tightening cover 50, specifically, the following rapid wiring devices can be subdivided, which are described as follows:

[Screw Locking Type Rapid Wiring Device]

Referring to FIG. 1 to FIG. 5, it is a screw locking type rapid wiring device of the present invention, wherein the tightening cover 50 is a rotating cover 50*a* that can be twisted manually. The lower end of the rotating cover 50*a* has an internally threaded hole 53. The above-mentioned push portion 51 is implemented in the center of the internally threaded hole 53 and constituted by a push post, so that the internally threaded hole 53 of the rotating cover 50*a* can be locked to the external threads 121 of the two position-limiting portions 12 of the box body 10. In this way, the user manually locks the rotating cover 50*a*, so that the push portion 51 pushes the above-mentioned wire box 40 (as shown in FIG. 5) to move toward the bottom in the limiting groove 11, so that the tip portions 21 of the two conductors 20 pierce the insulating layer 61 of the second electric wire 60.

Figure 6:
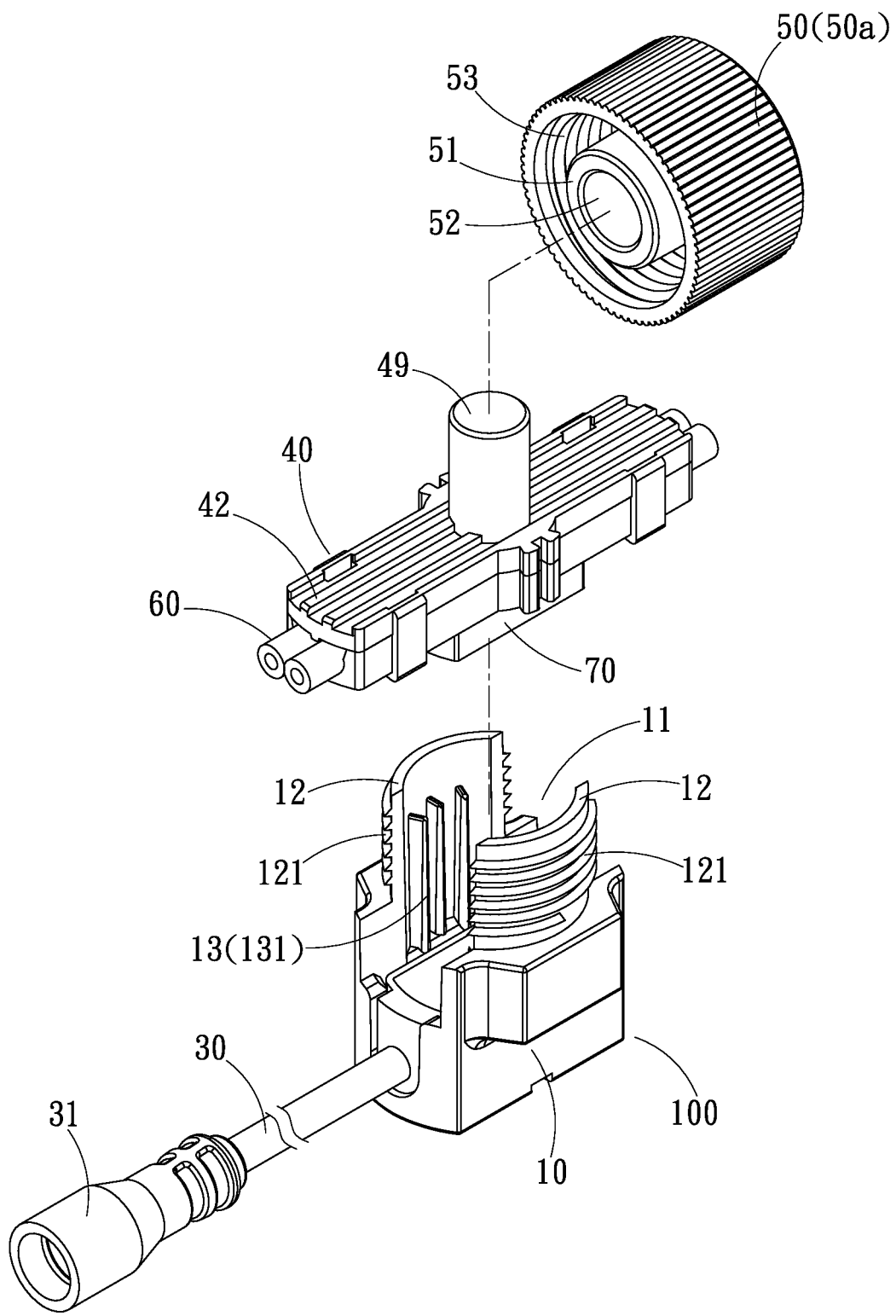
FIG. 6 is an exploded schematic diagram of the screw locking type rapid wiring device and wire box of the present invention.
Figure 11:
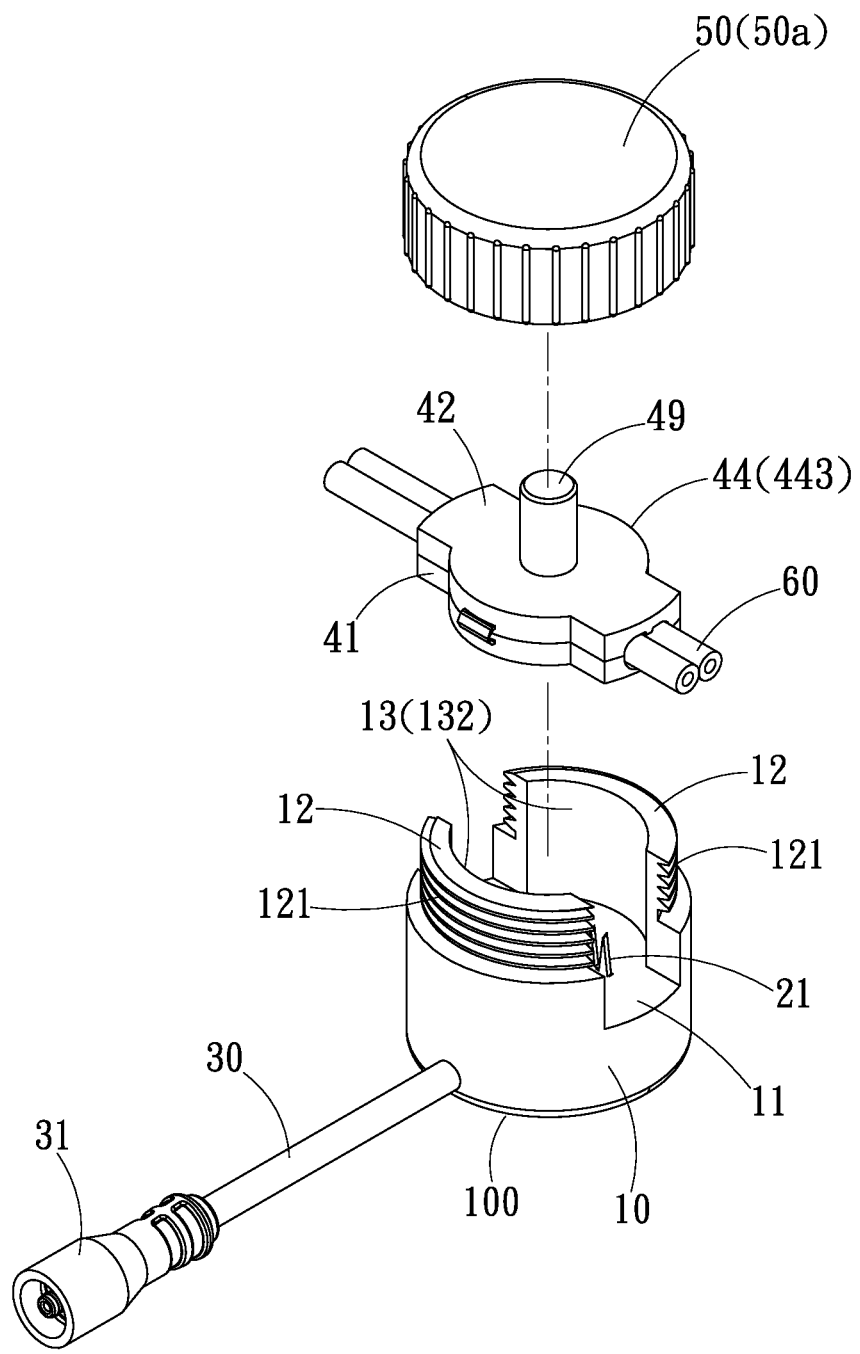
FIG. 11 is an exploded schematic view of the fifth embodiment of the screw locking type rapid wiring device and wire box of the present invention.

In the screw locking type rapid wiring device embodiment, the limiting groove 11 is between the two position-limiting portions 12 of the box body 10, so the external threads 121 of the two position-limiting portions 12 are not a completely circled spiral. In this way, when the user rotates the rotating cover 50*a* manually, the internal thread of the internally threaded hole 53 cannot be correctly matched with the external threads 121 of the two position-limiting portions 12, which causes the rotating cover 50*a* to be skewed and crooked when locked in. In order to overcome the above-mentioned problem of easy crookedness during locking, as shown in FIG. 6 and FIG. 7 or FIG. 11, a positioning column 49 can be implemented on the upper wire box part 42 of the wire box 40 of the present invention, and on the push portion 51 of the above-mentioned rotating cover 50*a* is concavely provided with a positioning hole 52, The positioning column 49 is encased by the positioning hole 52 of the rotating cover 50*a*. When the user rotates the rotating cover 50*a* manually, the push portion 51 is pushed to the top of the upper wire box part 42 or the positioning column 49, so that the wire box 40 has the function of guiding and locking the rotating cover 50*a* on the box body 10.

[Rotary Fastening Type Rapid Wiring Device]

Figure 12:
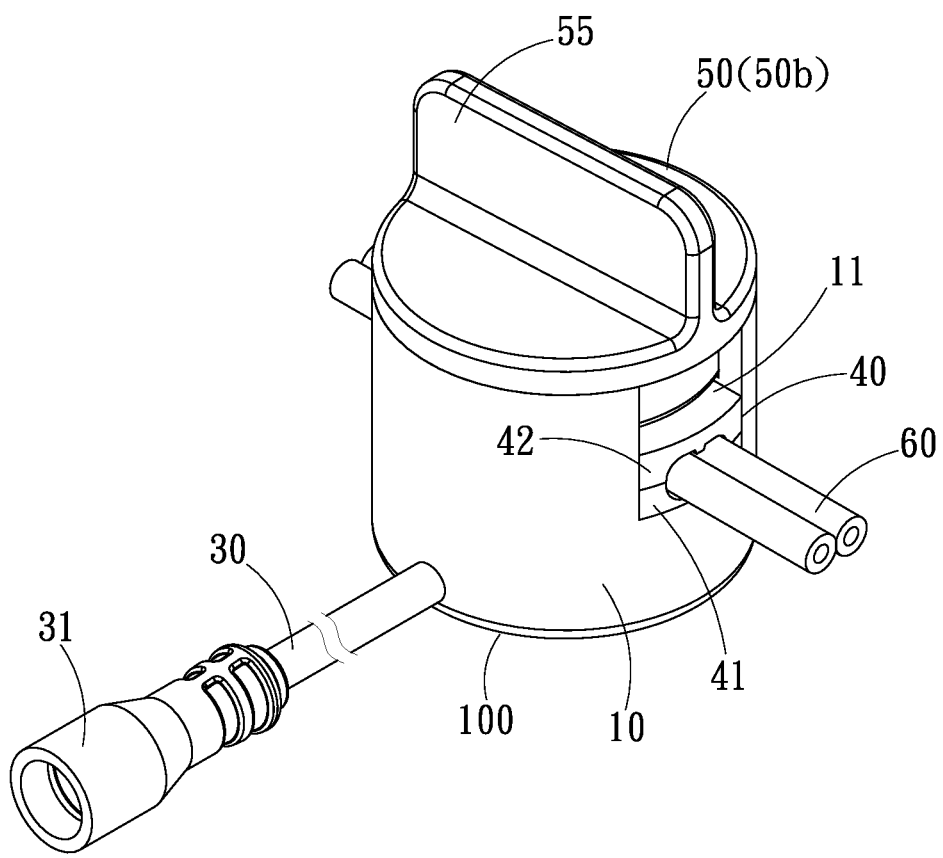
FIG. 12 is a schematic diagram of the combination of the embodiment of the rotary fastening type rapid wiring device of the present invention.
Figure 13:
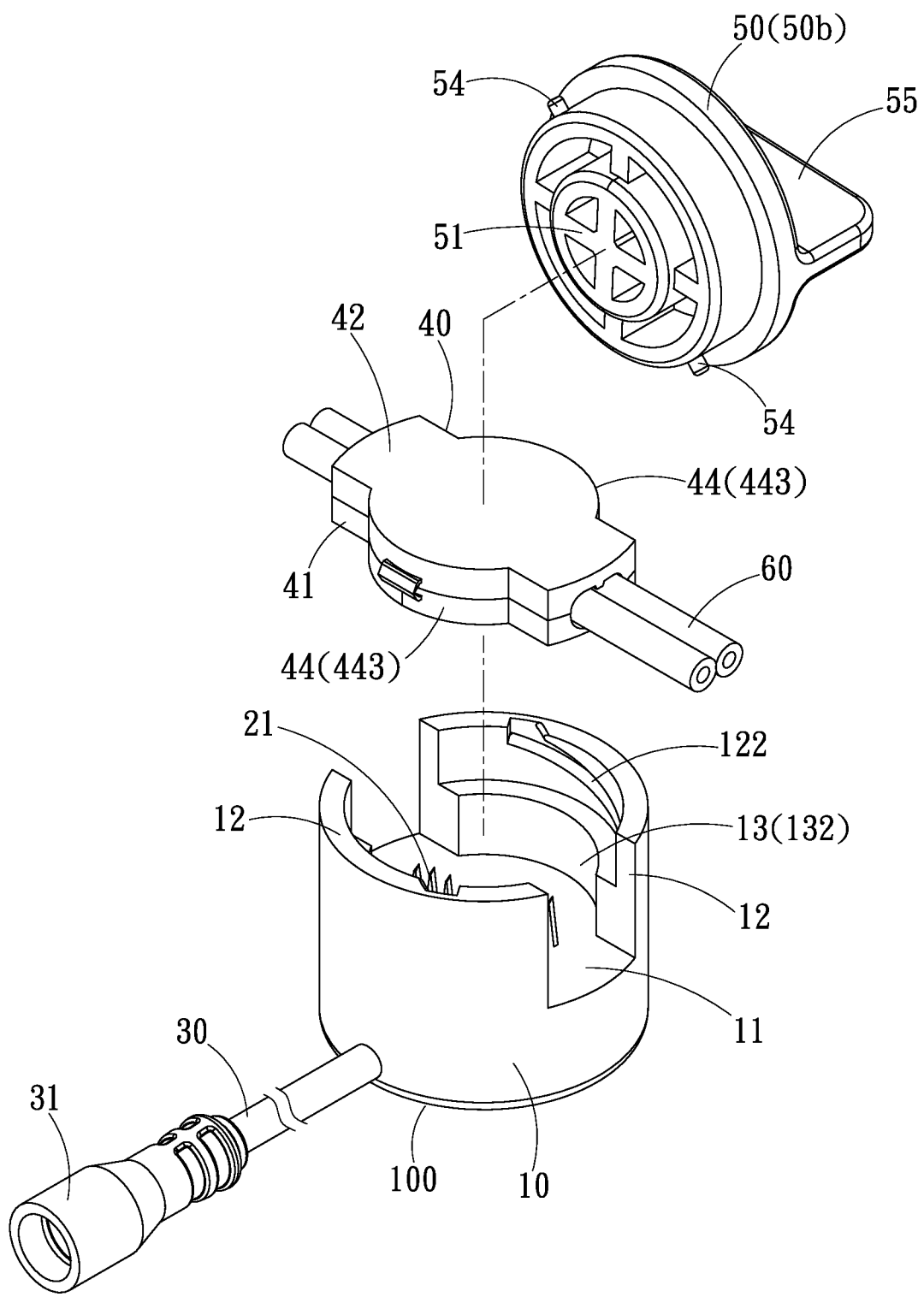
FIG. 13 is an exploded schematic diagram of the rotary fastening type rapid wiring device of the embodiment of FIG. 12 of the present invention.

Referring to FIG. 12 and FIG. 13, it is a rotary fastening type rapid wiring device of the present invention, wherein the tightening cover 50 is also a rotating cover 50*b* that can be manually twisted. The difference from the rotating cover 50*a* described above is that in this embodiment, a non-threaded first fastening portion 122 is respectively implemented on the inner surface or the outer surface of each position-limiting portion 12 of the junction box 100. The first fastening portion 122 can be an L-shaped groove recessed into each position-limiting portion 12. The circumferential surface of the rotating cover 50*b* is provided with a second fastening portion 54, and the second fastening portion 54 is a post or bump. When the user combines the rotating cover 50*b* with the two position-limiting portions 12, the second fastening portion 54 and the first fastening portion 122 can be fastened together by inserting and rotating the rotating cover 50*b* to make the push portion 51 of the rotating cover 50*b* push the wire box 40 with a rotating action, so that the tip portions 21 of the above-mentioned conductors 20 passe through the wire box 40 and then penetrate into the insulating layer 61 of the second electric wire 60. Wherein, the top surface of the rotating cover 50*b* can protrude a force application convex portion 55, so that the user can manually rotate the rotating cover 50*b*.

[Clamshell Type Rapid Wiring Device]

Figure 14:
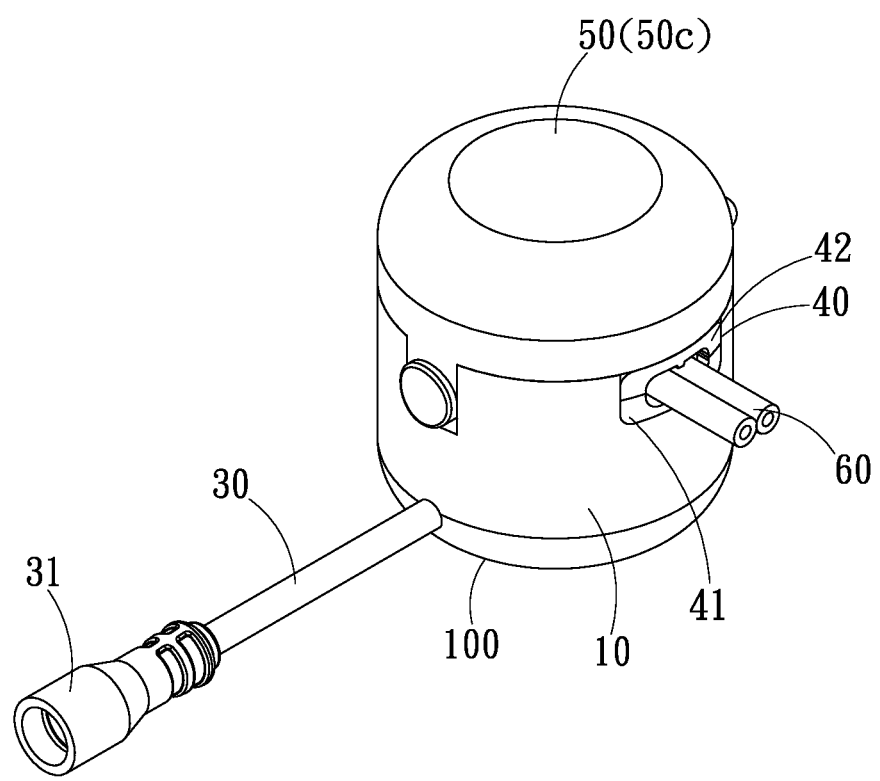
FIG. 14 is a combined schematic diagram of the embodiment of the clamshell type rapid wiring device of the present invention.
Figure 15:
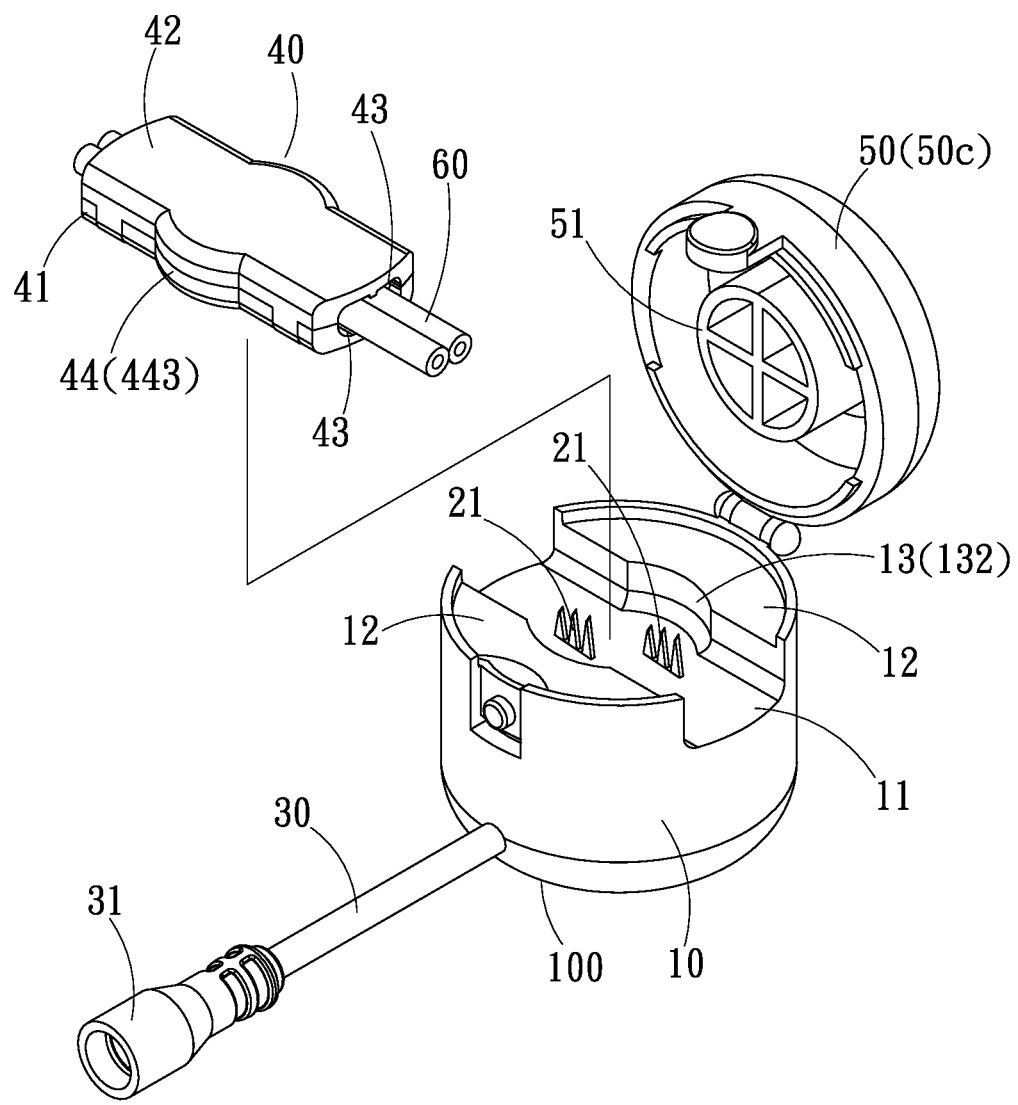
FIG. 15 is an exploded schematic diagram of the embodiment of the clamshell type rapid wiring device of FIG. 14 of the present invention.

Referring to FIG. 14 and FIG. 15, it is an example of a clamshell type rapid wiring device of the present invention, which implements the above-mentioned tightening cover 50 into a flip cover 50*c*. The center below the flip cover 50*c* forms a push portion 51, and one side of the flip cover 50*c* is pivotally connected to one side of the box body 10 of the junction box 100 through a pivot structure. The other side of the flip cover 50c can be fastened to the other side of the box body 10, and the fastening structure is the same as the above wire box 40. Thus, when the user puts the wire box 40 into the limiting groove 11 on the box body 10, and then closes the flip cover 50c to cover the wire box 40, the pressure of closing and pressing down the flip cover 50c is utilized, so that the push portion 51 pushes the wire box 40, so that the tip portions 21 of the above-mentioned conductors 20 pass through the wire box 40 and then penetrate into the insulating layer 61 of the second electric wire 60.

Figure 16:
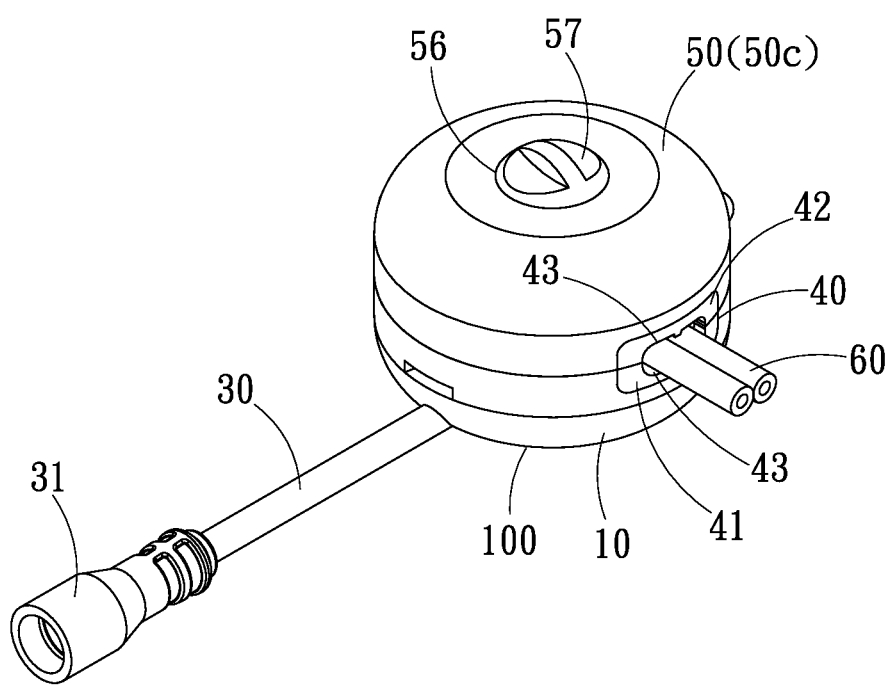
FIG. 16 is a schematic diagram of the embodiment of the combination of the clamshell type rapid wiring device and the screw post of the present invention.
Figure 17:
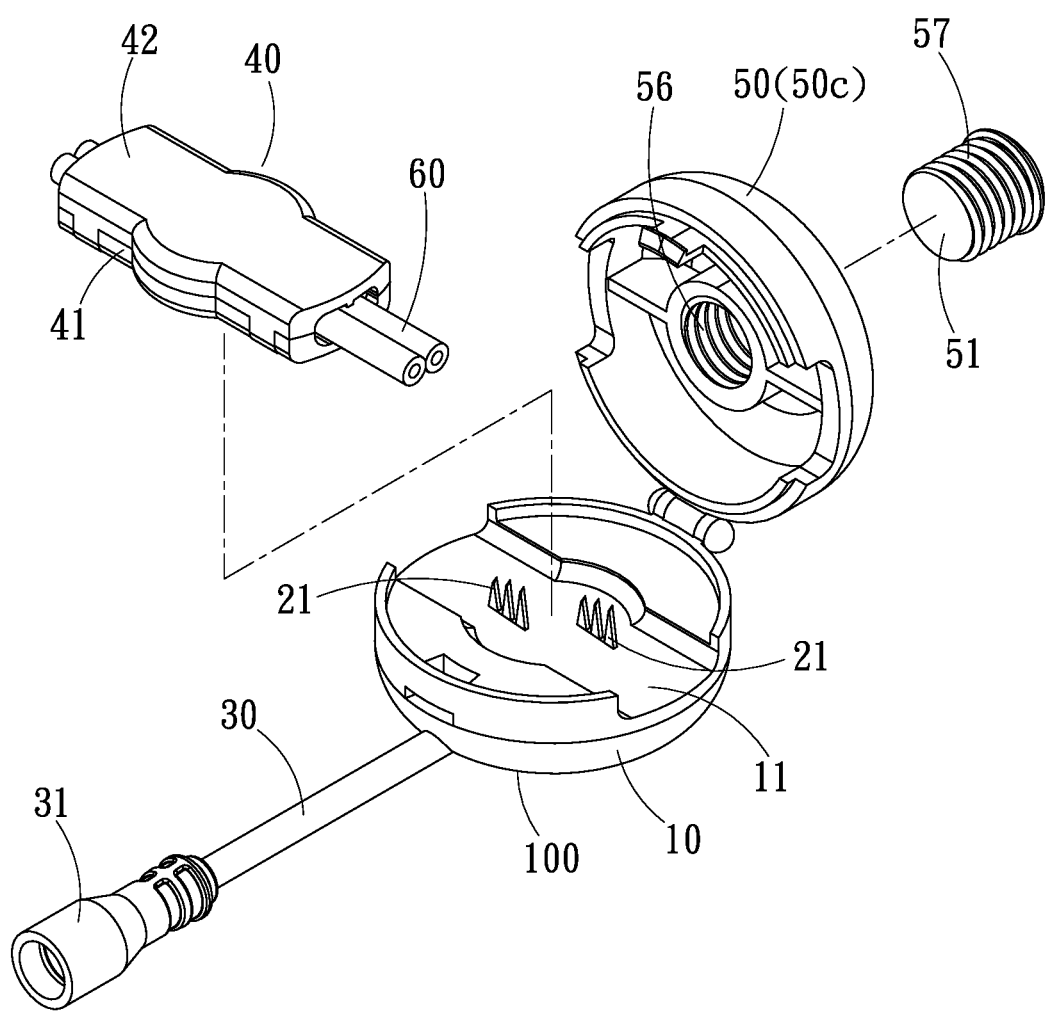
FIG. 17 is a schematic diagram of the embodiment of the combination of the flip-type quick wiring device and the screw post of the present invention.

Referring to FIG. 16 and FIG. 17, it is another example of a clamshell type rapid wiring device of the present invention. The flip cover 50c comprises a screw hole 56 and a screw post 57. The screw hole 56 communicates with the upper and lower sides of the center of the flip cover 50c, the screw post 57 is locked into the screw hole 56, and the end of the screw post 57 constitutes the push portion 51. The user puts the above-mentioned wire box 40 into the limiting groove 11 on the box body 10, and then closes the flip cover 50c to cover the wire box 40, and then locks the screw post 57 with a tool or by hand, so that the push portion 51 of the screw post 57 can push the wire box 40, and then the tip portions 21 of the above-mentioned conductors 20 pass through the wire box 40 and then penetrate into the insulating layer 61 of second electric wire 60.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rapid wiring device, comprising:
a junction box comprising a box body, two conductors and a first electric wire, said box body comprising a limiting groove located on an upper part thereof and two position-limiting portions located on both sides of said limiting groove, said two conductors being set in said box body, each said conductor having a tip portion protruding from a bottom surface of said limiting groove and extending to said limiting groove, said first electric wire being respectively connected to said two conductors;
a wire box comprising a lower wire box part and an upper wire box part capable of being closed together, said lower wire box part comprising a wire groove located on an upper part thereof, said wire groove extending to both ends of said lower wire box part for the placement of a second electric wire in said wire groove, said upper wire box part covering said lower wire box part and covering said wire groove and said second electric wire, said wire box being able to sandwich said second electric wire and put said second electric wire into said limiting groove of said junction box; and
a tightening cover is detachably combined on an upper part of said junction box, said tightening cover comprising a push portion capable of exerting thrust on said wire box, said push portion pushing said wire box to move towards a bottom of said limiting groove, so that said tip portions of said two conductors pass through said wire box and penetrate an insulating layer of said second electric wire until said tip portions touch a core wire of said second electric wire.

2. The rapid wiring device as claimed in claim 1, further comprising a waterproof film selectively set on a bottom surface of said wire groove of said lower wire box part or under said lower wire box part, said waterproof film being used to make said tip portions of said two conductors pass through said waterproof film, so that said waterproof film is tightly bonded to said tip portions and an outer surface of said second electric wire.

3. The rapid wiring device as claimed in claim 2, wherein said lower wire box part is provided with a first perforation connecting said wire groove and said lower wire box part; said waterproof film comprising a bump located on one or both sides thereof corresponding to said first perforation, said bump being provided with a second perforation connected to the other side of said waterproof film, said waterproof film being set on said lower wire box part so that said bump is embedded in said first perforation; said tip portions of said two conductors pass through said second perforation of said waterproof film, and then penetrate into the insulating layer of said second electric wire.

4. The rapid wiring device as claimed in claim 3, wherein said waterproof film is selectively made of silicone, rubber or jelly glue.

5. The rapid wiring device as claimed in claim 1, wherein said box body comprises a first guide portion located on an inner wall of said two position-limiting portions; said wire box comprises a second guide portion located on both sides of said lower wire box part and said upper wire box part; said wire box is placed in said limiting groove, so that said first guide portion locates said second guide portion.

6. The rapid wiring device as claimed in claim 5, wherein said first guide portion comprises a plurality of first guide strips protruding from inner side walls of said two position-limiting portions into said limiting groove, and said second guide portion comprises a plurality of second guide strips and guide grooves protruding from both sides of said lower wire box part and said upper wire box part.

7. The rapid wiring device as claimed in claim 5, wherein said first guide portion comprises a concave arc surface formed on an inner wall thereof, and said second guide portion comprises a plurality of semicircular bumps protruding from both sides of comprises lower wire box part and comprises upper wire box part; when said wire box is placed in said limiting groove, said semicircular bumps fit said concave arc surface.

8. The rapid wiring device as claimed in claim 1, wherein said wire box further comprises a buckle structure used to fasten said lower wire box part and said upper wire box part together.

9. The rapid wiring device as claimed in claim 8, wherein said buckle structure comprises at least one first fastening portion on both sides of said lower wire box part, at least one second fastening portion on both sides of said upper wire box part, and said at least one second fastening portion on said upper wire box part is fastened to said at least one first fastening portion on said lower wire box part.

10. The rapid wiring device as claimed in claim 9, wherein each said first fastening portion is a fastening groove, and each said second fastening portion is a fastening elastic piece.

11. The rapid wiring device as claimed in claim 8, wherein said lower wire box part of said wire box and one side of said upper wire box part are connected together through an integral molding structure or a pivot structure, so that said lower wire box part and said upper wire box part are able to be flipped open and closed.

12. The rapid wiring device as claimed in claim 11, wherein said lower wire box part of said wire box and the other side of said upper wire box part are fastened together through said buckle structure.

13. The rapid wiring device as claimed in claim 1, wherein said wire box further comprises a first convex strip located on a bottom surface of said wire groove and a second convex strip located on a bottom of said upper wire box part, said first convex strip and said second convex strip clamping opposing upper and lower sides of said second electric wire.

14. The rapid wiring device as claimed in claim 1, wherein the circumference of said two position-limiting portions of said junction box is provided with external threads, and said tightening cover is a rotating cover having an internally threaded hole on a lower end thereof; said push portion comprises a push post located in the center of said internally threaded hole, and said internally threaded hole of said rotating cover is lockable to said external threads of said two position-limiting portions.

15. The rapid wiring device as claimed in claim 14, wherein said upper wire box part of said wire box comprises a positioning column, and said push portion of said tightening cover comprises a positioning hole, said positioning hole of said tightening cover covering said positioning column, and then said push portion pushing said upper wire box part or said positioning column.

16. The rapid wiring device as claimed in claim 1, wherein said junction box further comprises a first fastening portion located on an inner side of each of said two position-limiting portions; said tightening cover is a rotating cover, said rotating cover comprising a second fastening portion on the circumference thereof, said rotating cover being combined on said two position-limiting portions, said second fastening portion and said first fastening portion being fastened together through a rotating action.

17. The rapid wiring device as claimed in claim 1, wherein said tightening cover is a flip cover, said flip cover having one side thereof pivotally connected to one side of said box body of said junction box through a pivot structure, and the other side of said flip cover being fastenable to the other side of said box body.

18. The rapid wiring device as claimed in claim 17, wherein said flip cover comprises a screw hole and a screw post, said screw hole connecting opposing top and bottom of said flip cover, said screw post being locked into said screw hole, said screw post having a distal end thereof constituting said push portion.

\* \* \* \* \*